Jan. 20, 1970  F. B. ROMBERG  3,490,175
AUTOMATIC VEHICLE ACTUATED GATE

Filed Aug. 9, 1968  4 Sheets-Sheet 1

Jan. 20, 1970   F. B. ROMBERG   3,490,175
AUTOMATIC VEHICLE ACTUATED GATE
Filed Aug. 9, 1968   4 Sheets-Sheet 2

Jan. 20, 1970    F. B. ROMBERG    3,490,175
AUTOMATIC VEHICLE ACTUATED GATE
Filed Aug. 9, 1968    4 Sheets-Sheet 3
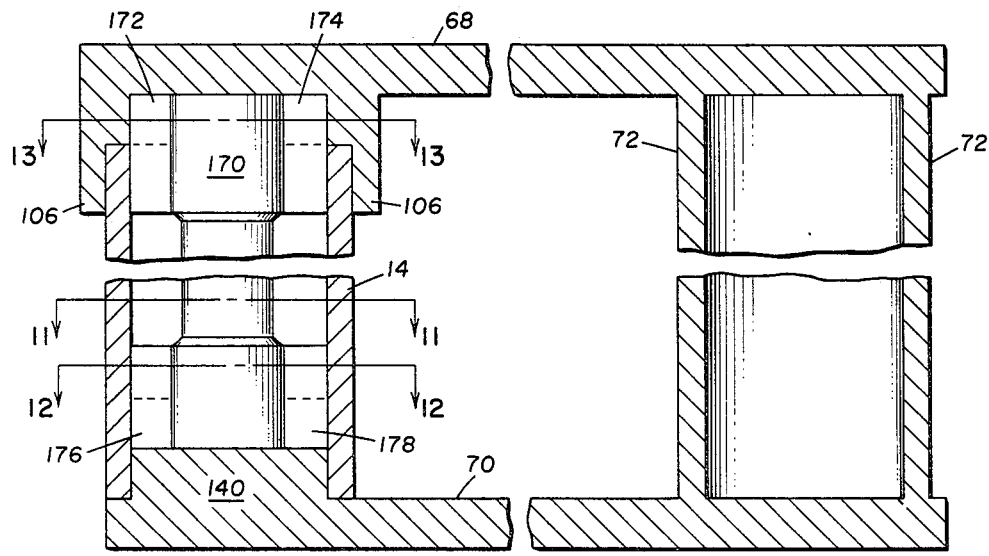
FIG. 10
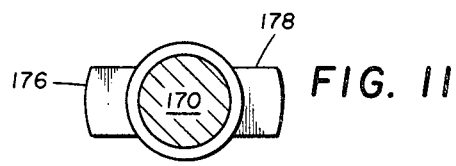
FIG. 11
FIG. 12
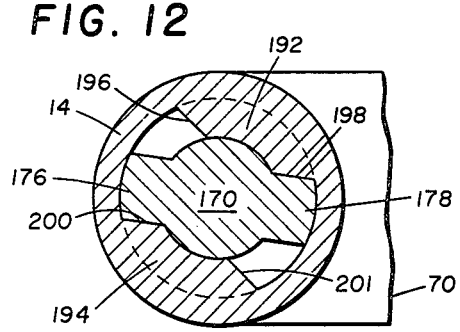
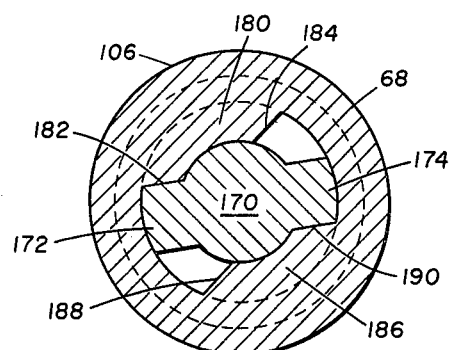
FIG. 13
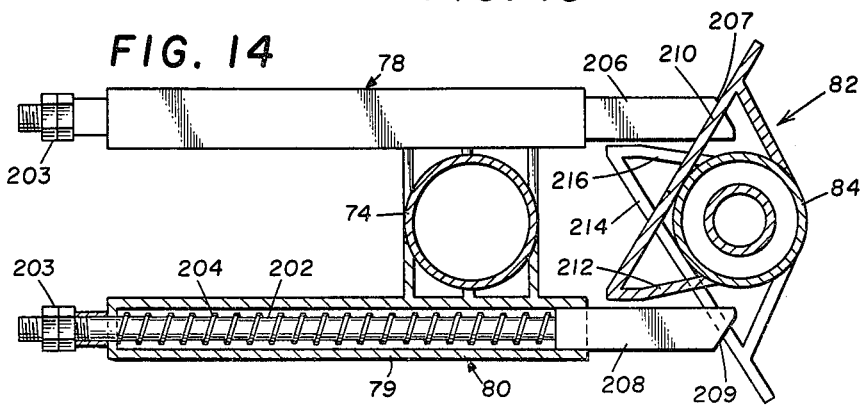
FIG. 14

Jan. 20, 1970  F. B. ROMBERG  3,490,175
AUTOMATIC VEHICLE ACTUATED GATE
Filed Aug. 9, 1968  4 Sheets-Sheet 4
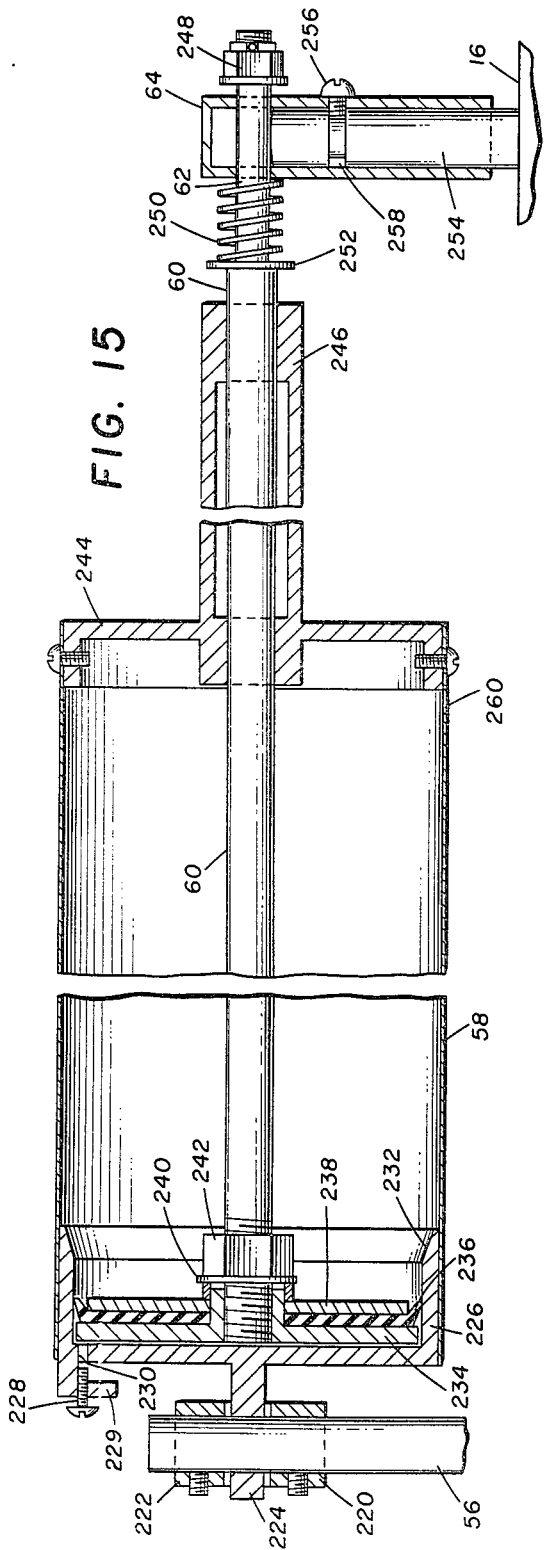
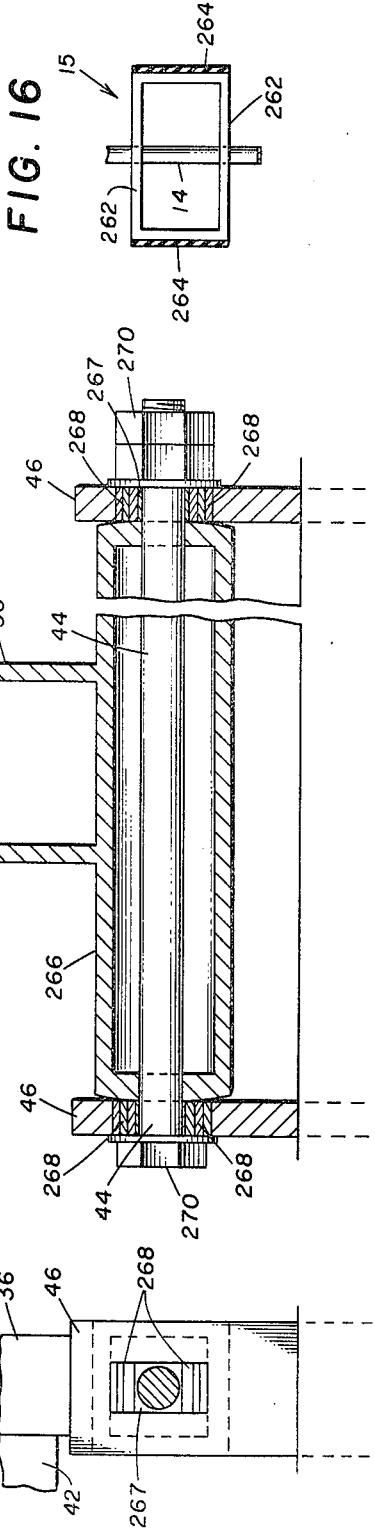

United States Patent Office 3,490,175
Patented Jan. 20, 1970

3,490,175
AUTOMATIC VEHICLE ACTUATED GATE
Felix B. Romberg, P.O. Box 218, Holland, Tex. 76534
Filed Aug. 9, 1968, Ser. No. 751,530
Int. Cl. E05c *15/00;* E05f *1/08*
U.S. Cl. 49—364                                                       6 Claims

ABSTRACT OF THE DISCLOSURE

A two-way swinging bumper gate is divided into two resiliently aligned pivotally connected sections. When the closed gate is pushed by a vehicle bumper, the gate bows in the middle and stores energy. The bowing of the gate shortens the distance between the ends of the gate and thus frees the latched end. The stored energy then swings the released end of the gate forward, eliminating the bow and generating kinetic energy which swings the gate away from the vehicle bumper and to an open position. A fluid controlled piston holds the gate open for a predetermined time, after which the gate is closed by the force of gravity.

FIELD OF THE INVENTION

This invention relates to gates, and more particularly to automatic bump gates capable of being automatically opened by vehicles and the like.

PRIOR ART

Gates which could be opened by the front bumpers of automobiles and then which would close automatically were generally developed at the time when the front automobile bumpers extended in front of the body shell and were deeply resilient. An example of one such gate is described on pages 42 and 43 of Farmers Bulletin No. 1832 published in 1954 by the United States Department of Agriculture. Subsequent to the development of that gate, automobile manufacturers changed to stiff ornate bumpers set close to the body shell, which rendered today's sleek cars unsuited for such bumper gates due to the inertial shock to the bumper from gates requiring driving speed to swing them open, the risk of body shell involvement, the wear and tear resulting when a straight moving bumper pushes a circularly swinging gate beyond the perpendicular position, and the chance of the car being caught by a backlashing gate.

Other types of automatic bump gates have thus been heretofore developed, but have fallen short of satisfying present day requirements. For instance, U.S. Patents No. 1,330,146 and 2,594,033 disclose gates wherein a vehicle a vehicle initially supplies an external force sufficient to unlatch the gate. Once unlatched, energy is stored in a spring on the gate and then released to assist in swinging the gate away from the vehicle and into an open position. However, the gates disclosed in such patents have generally required rather complex mechanism which are subject to wear and mechanical failure.

Further, such spring-loaded automatic gates heretofore developed have often been subject to operational malfunctions upon the occurrence of rather minor positional shifts between the gate and the supporting fence posts. Additionally, bumper engaging portions of such gates have often projected outwardly from the gates at such distances as to be a hazard to the sides of vehicles passing through the gate. Such previously developed gates have also often required rather sensitive application of the thrust supplied by the vehicle, thereby causing scuffing of the vehicle bumper and damage to the gate upon unskillful direction of the vehicle against the gate.

SUMMARY OF THE INVENTION

In accordance with the present invention, a gate is transversely divided into a mounted section and a pivotally connected distal section. Resilient structure, such as a torsion spring bar, is connected between the gate sections to tend to maintain the gate portions in a common plane. When a vehicle exerts an external force to the gate sections, the gate is bowed and the torsion spring bar is flexed to thereby store energy. The gate is unlatched by the shortening of the gate due to the bowing thereof, and the spring bar stored energy is applied to snap the gate from its bowed condition with sufficient momentum to swing the gate to its open position. Structure is also provided to maintain the gate in its open position for a preselected time, after which the gate returns to the closed position by the force of gravity.

DRAWINGS

For a more complete understanding of the present invention and for further objects and advantages thereof, reference is now made to the following description taken in conjunction with the accompanying drawings, in which:

FIGURE 4 is a sectional view taken generally along the section line 4—4 of FIGURE 3;

FIGURE 5 is a sectional view taken generally along the section line 5—5 shown in FIGURE 3;

FIGURE 6 is a sectional view taken generally along the same plane as FIGURE 4 with the distal wing of the gate rotated counterclockwise and the axial wing of the gate remaining stationary;

FIGURE 7 is a sectional view taken generally along the same plane as FIGURE 5 with the distal wing of the gate rotated counterclockwise and the axial wing of the gate remaining stationary;

FIGURE 10 is a sectional view of the preferred embodiment of the middle pivotal portion of the gate shown in FIGURE 1;

FIGURE 11 is a sectional view of the torsion bar spring only, taken generally along the section line 11—11 of FIGURE 10;

FIGURE 12 is a sectional view taken generally along the section line 12—12 in FIGURE 10;

FIGURE 13 is a sectional view taken generally along section line 13—13 in FIGURE 10;

FIGURE 14 is a sectional view of the latch mechanism taken generally along the section line 14—14 in FIGURE 1;

FIGURE 15 is a partly sectioned enlarged view of the vacuum lock cylinder shown in FIGURE 1;

FIGURE 16 is a side view of the bumper contact frame shown in FIGURE 1;

FIGURE 17 is a fragmentary sectional view taken generally along the section line 17—17 in FIGURE 1; and FIGURE 18 is an end view, partly cut away, of the structure shown in FIGURE 17.

DESCRIPTION OF THE PREFERRED EMBODIMENTS

Figure 1:
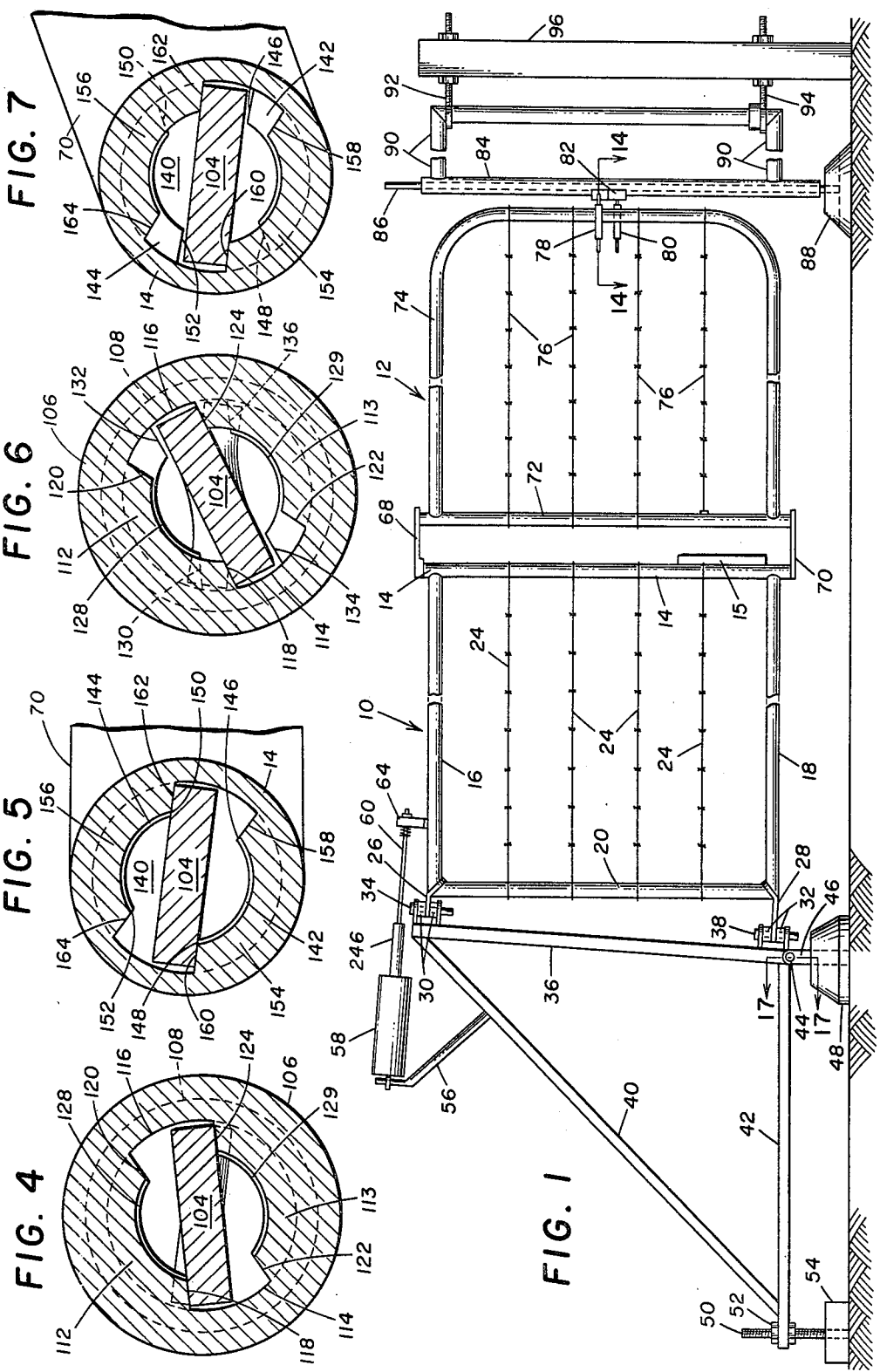
FIGURE 1 is a front view of the present gate in its closed position.

Referring to the drawings, FIGURE 1 is a side view of the present gate which comprises an axial gate section, or wing, designated generally by numeral 10 and a distal gate section, or wing, designated generally by numeral 12. Gate sections 10 and 12 are pivotally connected end-to-end at a vertical tubular member 14, which contains a torsion spring to be later described. This torsion spring normally tends to maintain the gate sections 10 and 12 in linear alignment, and the torsion spring stores energy through flexure when the gate sections are pivoted with respect to one another. When the gate is in the illustrated closed position of FIGURE 1, the axial and distal gate sections 10 and 12 extend laterally to act as a rigid barrier to livestock.

A bumper contact frame 15 is rigidly mounted on the tubular member 14. The axial gate section 10 comprises a rectangular rigid frame including horizontal tubular members 16 and 18 and vertical tubular members 14 and 20. Strands of barbed wire 24 extend between members 14 and 20 to discourage livestock without subjecting the gate to wind pressure. Hinge straps 26 and 28 are fixedly sandwiched into the gate corners at opposite ends of tubular member 20 and are mounted between pairs of spacers 30 and 32 respectively. A hinge pin 34 passes through the spacers 30 and the hinge strap 26 to pivotally secure the upper end of the axial gate section 10 to a support bar 36. Similarly, a hinge pin 38 pivotally connects the hinge strap 28 and spacers 32 to the lower end of the support bar 36.

The support bar 36 is mounted at a slight angle to the vertical leaning toward the closed position of the gate, and the axis of gate rotation defined by pins 34 and 38 is parallel thereto. Hinge strap 28 is longer than hinge strap 26 such that the tubular member 20 is parallel to tube 14. Because of the inclination of the axis of rotation, the gate tends to return to its closed position by gravity.

A support strut 40 is rigidly connected between bar 36 and a horizontal support member 42 also rigidly connected to bar 36. The support bar 36 is rigidly connected at its lower end to crosswise member 266 which is pivotally connected at a pin 44 to laterally spaced upright bars 46 in a concrete base 48. A bolt 50 is threadedly received within nuts 52 which are mounted over and under the horizontal support member 42. The lower end of the bolt 50 is anchored by a concrete block 54. Thus, with manipulation of the nuts 52, the inclination of the support bar 36 and the adjacent axis of gate rotation may be adjusted should it become shifted after a period of service.

A support arm 56 extends from the strut 40 and carries one end of an air cylinder 58. A piston rod 60 has a reduced diameter outer end portion 62 that is connected to a cylinder 64 which is rotatably disposed over an upstanding member connected to tubular frame member 16, as will be later described.

A pair of horizontally disposed hinge bars 68 and 70 of the gate's distal wing 12 are pivotally connected to the tubular member 14 and are rigidly connected to a vertical torque tube 72. A U-shaped tubular member 74 is rigidly connected at both ends to the torque tube 72. Strands of barbed wire 76 are strung between the torque tube 72 and the U-shaped member 74.

Symmetrical latch members 78 and 80 are connected to the U-shaped member 74 and serve to normally latch to a cam member 82, as will be described later. Cam member 82 is rigidly secured to an upright tubular member 84. A rod 86 extends through the tubular member 84 and into a slit provided in a concrete block 88. Tubular member 84 constitutes one end of a rigid rectangular supplementary gate 90 which is provided for increasing the width of the driveway when extra wide farm equipment is to be accommodated. Eye bolts 92 and 94 are bolted to an upright support 96 to pivotally carry the supplementary gate 90. When it is desired to open the supplementary gate, the rod 86 is pulled upwardly from the concrete block 88 and the supplementary gate is then pivoted in the eye bolts 92 and 94. The rod 86 may then be dropped to anchor the supplementary gate in the open position. Adjustment of eye bolts 92 and 94 inwardly or outwardly at the support 96 permits proper spacing of the cam 82 with respect to latch members 78 and 80.

Figure 2:
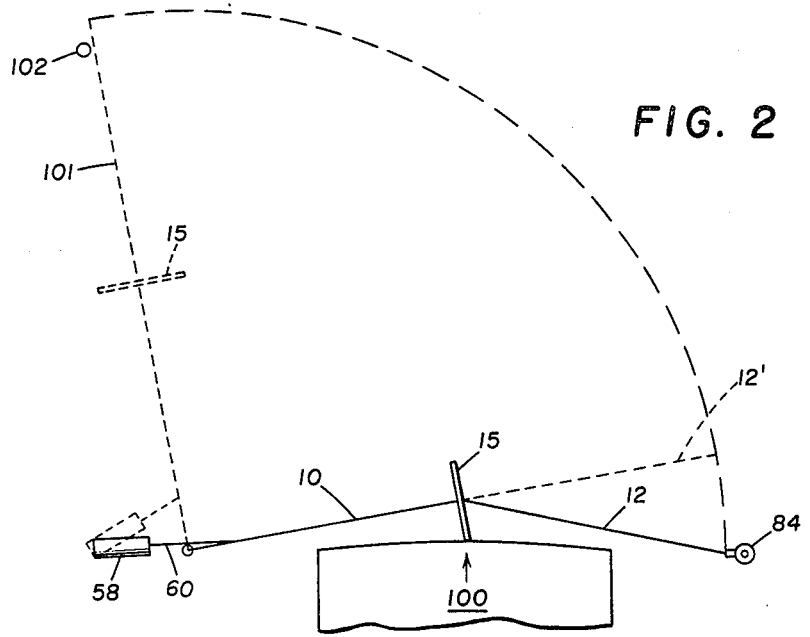
FIGURE 2 is a somewhat diagrammatic illustration of the automatic operation of the gate.

The operation of the present gate may be best understood by reference to FIGURE 2, which illustrates the application of an external force to the gate by a vehicle 100. Vehicle 100 applies force to the bumper contact frame 15, thereby bowing the gate by causing the gate sections 10 and 12 to pivot with respect to one another about the tubular member 14. As will be later described in detail, this pivoting of the gate sections 10 and 12 causes energy to be stored by a torsion bar spring within the tubular member 14.

Further, bowing of the gate sections shortens the distance between the ends of the gate, releasing the latched end of the gate by withdrawing it from the cam member 82 located on the upright tubular member 84. When the gate becomes released, the stored energy in the torsion spring within the tubular member 14 causes the distal gate section 12 to snap forward into linear alignment with the axial section 10, as indicated by the dotted line designated 12'. By this snapping action, the spring stored energy is transformed into kinetic energy which swings the gate way from the vehicle and to an open position designated generally by the dotted line 101, where a post 102 stops the gate.

As previously menioned, gravity tends to return the gate to the closed position. However, when the gate has opened against post 102, the air cylinder 58 exerts a force to prevent the gate from closing for a time interval sufficient to allow the vehicle 100 to pass through the gate opening. After a preselected time the air cylinder 58 releases the piston rod 60 to allow the gate to close by gravitational force.

Figure 3:
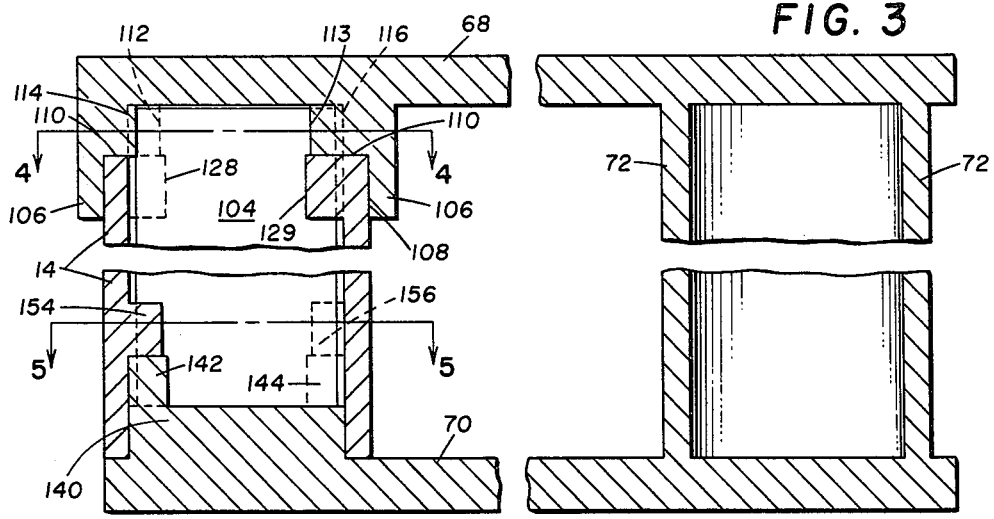
FIGURE 3 is a fragmentary sectional view of the middle pivotal portion of the gate shown in FIGURE 1.

FIGURE 3 is a sectional view of the vertical tubular member 14, the horizontal hinge bars 68 and 70 and the vertical torque tube 72. Disposed within the tubular member 14 is a torsion bar spring 104, which may have a rectangular cross section as shown in FIGURES 4 and 5. The torsion spring 104 may be made from spring steel and may be comprised of dual spring leaves or a single rectangular bar approximately 1½ inches wide by ⅜ inch thick.

The hinge bar 68 includes a downwardly facing integral ring 106 which has a counterbore portion 108 with an internal diameter accommodating the external diameter of the tubular member 14. The upper part of the tubular member 14 is received wtihin the counterbore 108 and abuts against an annular shoulder 110. As best shown in FIGURE 4, the annular ring 106 also includes two radially inwardly extending annular spring twisting segments 112 and 113. Segments 112 and 113 are separated by curved wall portions 114 and 116. Segment 112 defines shoulders 118 and 120, while segment 113 defines a pair of shoulders 122 and 124. A wide slotted keyway is thus defined by shoulders 118 and 122 and by wall portion 114. Similarly, another equally wide slotted keyway is defined by shoulders 120 and 124 and by wall portion 116.

The upper end of the tubular member 14 includes a pair of radially inwardly facing annular spring twisting projections 128 and 129 having substantially the same configuration as segments 112 and 113, although illustrated extending radially inwardly for a slightly greater distance. A pair of slotted keyways is defined by spring twisting projections 128 and 129, with these keyways having essentially the same shape as the slotted keyways defined by hinge bar 68. Projection 128 defines shoulders 130 and 132, while projection 129 includes shoulders 134 and 136, best shown in FIGURE 6.

In the normal closed position of the gate shown in FIGURE 1, the torsion bar spring 104 is best shown in FIGURE 4 as abutting with the vertically aligned shoulders 118 and 130, and the aligned shoulders 124 and 136.

As shown in FIGURES 3 and 5, the hinge bar 70 includes an upstanding boss 140 which projects into the interior of the lower end of tubular member 14 with a working fit. Boss 140 includes a pair of upstanding annular spring twisting segments 142 and 144. As best shown in FIGURE 7, segment 142 defines shoulders 146 and 148, while segment 144 defines shoulders 150 and 152. The tubular member 14 includes a pair of radially inwardly extending annular spring twisting segments 154 and 156 having the same general configuration as the segments 142 and 144, but illustrated with slightly less radial width. As shown in FIGURES 5 and 7, segment 154 defines shoulders 158 and 160, while segment 156 defines shoulders 162 and 164.

In FIGURES 3 and 5, the lower end of the torsion bar spring 104 may be seen to extend between the annular segments 142 and 144 of the boss 140 to abut with the upper surface of the boss. When the two wings of the gate are in alignment, the lower end of the torsion bar spring 104 abuts with shoulders 148 and 160, and with shoulders 150 and 162, as shown in FIGURE 5. These shoulders abut the lower end of the spring in the opposite direction compared to the shoulders at the upper end of the spring and are situated so the spring is twisted when the two wings of the gate are in alignment. This twist is irreducible because the spring is twisted by elements of the opposite ends of the tube 14 which does not yield because of its torsional stiffness. The torsion bar spring is similarly twisted and confined by the spring twisting elements in the hinge bars 68 and 70 which are prevented from rotating relatively to each other by the connecting torque tube 72 of the distal wing of the gate.

When a vehicle bumper pushes against the closed gate in either direction, the bumper must apply sufficient force to overcome the irreducible torque in the spring before the gate will begin to bow. Subsequent bowing results in additional twisting of the spring bar 104, requiring progressively more bumper pressure. The stress which the spring has before the gate is bowed, called initial stress, serves two purposes. It prevents the gate from being bowed by minor lateral pressure, and it permits storing more available energy in the spring with the same maximum stress of the spring and the gate.

FIGURES 6 and 7 show how the spring is twisted when the distal wing of the gate is pivoted counterclockwise while the axial wing remains in the same position as in FIGURES 4 and 5. It will be noted that in this instance the pair of spring twisting elements of hinge bar 68 twists the upper end of the spring counterclockwise and away from the adjacent spring twisting elements of tube 14. At the same time the pair of spring twisting elements in the lower hinge bar 70 move out of contact with the spring which remains in the grip of the adjacent pair of spring twisting elements of the lower end of tube 14.

Figure 8:
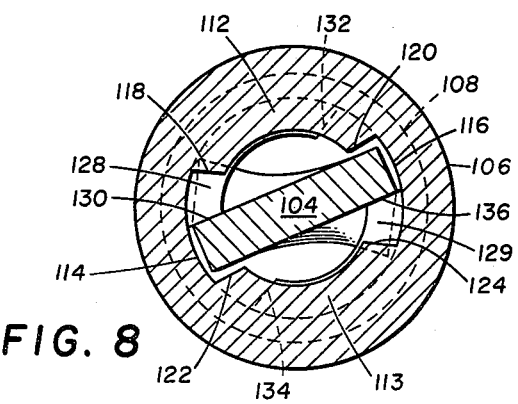
FIGURE 8 is a sectional view taken generally along the same plane as FIGURE 4, but with both wings of the gate rotated with respect to one another and to the rotation being opposite to that of FIGURE 6.
Figure 9:
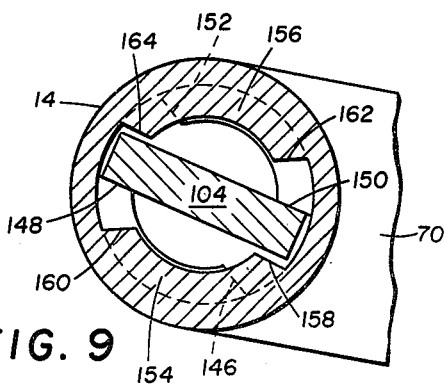
FIGURE 9 is a sectional view taken generally along the same plane as FIGURE 5, but with both wings of the gate rotated with respect to one another and to the rotation opposite to that of FIGURE 7.

In normal operation the gate is bowed as shown in FIGURE 2, and the axial and distal gate sections are turned about the pivot axis in opposite directions. Such operation is illustrated in FIGURES 8 and 9, wherein the axial and distal gate sections have each been rotated approximately 10 degrees. By comparing FIGURE 8 with the normal condition of the spring shown in FIGURE 4, it will be seen that the rotation of the axial gate section causes rotation of shoulders 130 and 136 to twist the upper portion of the spring in a counterclockwise manner. Similarly, it will be seen from a comparison of FIGURES 5 and 9, that the rotation of the distal gate section 12 causes rotation of shoulders 148 and 150 to rotate the lower portion of the spring 104 in a clockwise direction. This combined rotation of the opposite ends of the spring stores energy therein, and such energy propels the gate open as previously described in connection with FIGURE 2. Similar increase in flexure of the spring 104 occurs when the gate is bowed in the opposite direction, and therefore the present gate allows passage of vehicles through the gate from two directions.

It will be noted by comparison of the spring flexure in FIGURES 6 and 7 with the spring flexure in FIGURES 8 and 9 that the torsion bar spring is stressed the same way, rather than in reverse, when the gate is bowed in opposite directions. In each case the upper end of the spring is rotated in the one direction and the lower end of the spring is rotated in the other direction. In the one case the spring twisting elements in the upper hinge bar 68 and lower end of tube 14 twist the spring simultaneously in opposite directions. In the other case, spring twisting elements in the upper end of tube 14 and in the lower hinge bar 70 twist the spring in the same opposite directions. Only the shoulder on one end of each spring twisting element is employed to twist the spring. It is not intended that the spring be engaged by the other shoulders 120, 122, 132, 134, 146, 152, 158 and 164.

In the construction of the gate, the torsion bar spring 104 is inserted from the lower end of the tubular member 14 before the axial and distal gate sections are connected together. The spring is pushed upwardly through member 14 until the bar abuts with the bottom portion of the spring twisting elements 128 and 129. A suitable tool, such as a slotted wrench, is inserted into the top of the tubular member 14 and the spring is twisted in a counterclockwise manner until the upper end of the spring 104 slides upwardly into the slotted keyways between the spring twisting elements, as shown in FIGURE 4. The hinge bars 68 and 70 are then connected in the manner shown in FIGURE 3, closing the ends of the tube 14.

While the spring bar 104 having a rectangular cross-section is advantageous in illustrating the invention and for some applications, the preferred embodiment of the invention utilizes a torsion bar spring 170 having a circular cross-section except at the gripped ends, as shown in FIGURE 10. The round cross-section of this bar provides increased energy storage capacity per unit of volume, which can be taken advantage of by employing a lower unit stress in the spring material.

As shown in FIGURE 11, spring bar 170 comprises a solid cylinder along the majority of its length. FIGURE 10 illustrates radially outwardly extending lugs 172 and 174 provided on the upper end of the bar 170 and similar radially outwardly extending lugs 176 and 178 provided on the lower end thereof. The construction of the downwardly extending annular portion 106 of the hinge bar 68 is essentially similar to that shown in FIGURE 3, and the portion 106 telescopes with the end of the tubular member 14.

FIGURE 13 illustrates the hinge bar 68 which includes an annular spring twisting segment 180 having shoulders 182 and 184. Similarly, hinge bar 68 includes an oppositely facing annular spring twisting segment 186 having shoulders 188 and 190. The tubular member 14 includes radially inwardly extending annular spring twisting segments of the same configuration as segments 180 and 186, which are disposed directly beneath the segments 180 and 186. In the normal closed position of the gate, shoulders 182 and 190 bear against lugs 172 and 174. When the gate sections 10 and 12 are pivoted with respect to one another, the shouldetrs of the spring twisting segments bear against the lugs of bar 170 to increase the flexure of the bar in the same manner as that previously described.

FIGURE 12 illustrates the configuration of radially inwardly extending annular spring twisting segments 192 and 194 which extend from the tubular member 14. Segment 192 has shoulders 196 and 198 with shoulder 198 normally bearing against the lug 178 to flex the spring 170. Additionally, the segment 194 has shoulders 200 and 201, with the shoulder 200 normally bearing against lug 176. An inspection of FIGURES 12 and 13 will illustrate that the spring 170 is normally twisted in the same manner as the rectangular section bar spring previously described. This spring 170 thus has an initial stress which tends to maintain gate sections 10 and 12 in a common plane.

FIGURE 14 illustrates in greater detail the construction of the latch mechanism for the present gate. Latch members 78 and 80, previously referred to, are identical and each includes a rod 202 which is biased by a spring 204 within a housing 79. Nuts 203 allow adjustment of the effective movement of rods 202. Latch ends 206 and 208 are integral with the rods 202 and are passed outwardly from the housing of each of the latch members 78 and 80 by the action of the spring 204. Latch end 206 has a beveled edge 207 and end 208 has a beveled end 209. The cam member 82 comprises a cam plate 210 having a bent back stop portion 212, and a second cam plate 214 has a back stop portion 216. Cam plates 210 and 214 slant in opposite directions, and are spaced vertically along the tubular member 84. The cam plate 210 is disposed at the level of the end 208 while the cam plate 214 is disposed at the level of end 206. In the closed position of the gate, the end 208 abuts with the stop portion 212, while end 206 is held in place by the stop member 216. When the gate is bowed by the application of external force from an automobile, the effective length of the gate is shortened as previously described, thereby allowing the latch end on the gate side to which the force is applied to ride around the end of the respective stop member to free the gate. For instance, when the gate is bowed in the direction shown in FIGURE 2, latch end 208 rides out from contact with stop portion 212.

Upon closing of the gate from an open position, the respective latch end 206 or 208 cams against the respective cam plate, thereby compressing the spring 204. When the gate reaches the closed position, the latch end is forced outwardly by the spring into the illustrated position and is held in place by a stop member. Hence, because of the symmetrical arrangement of the present latch, the gate may be opened and closed in either direction. The gate may also be opened manually.

FIGURE 15 illustrates in greater detail the construction of the air cylinder 58 which holds the gate open for a preselected time interval. The support arm 56 includes at its upper end spaced apart collars 220 and 222. A projection 224 from the air cylinder has an aperture therethrough for receiving the support arm 56 between the spaced apart collars 220 and 222. The projection 224 is integrally connected to a cylinder headpiece 226 which has a smalled internal diameter than the main body of the cylinder 58. An adjusting screw 228 is threaded through an opening in an overhanging projection 229 of the headpiece 226 and directed toward a small air port, or aperture, 230 for adjusting the rate of air admission into the head end of the cylinder 58 through this air port. The headpiece 226 includes a tapered annular surface 232.

The piston rod 60 carries a connected circular piston member 234. A flexible cupped member 236 is clamped between member 234 and a plate 238. The cupped member 236 may be of a suitable elastomeric such as synthetic rubber, or alternatively may be made from leather or the like. The peripheral part of the cupped member 236 extends away from the headpiece 226 such that the periphery of the member 236 contacts the interior diameter of the headpiece 226. However, the periphery of member 236 does not contact the larger internal diameter of the main body of the cylinder 58. The cupped member and plate 238 are held in place by a spacer, a washer 240 and a nut 242 on the piston rod 60. An enclosure member 244 is rigidly connected to the outer end of the cylinder 58 by suitable screws. Member 244 includes a guide portion 246 to maintain the axial alignment of the rod 60.

At the opposite end from the piston, the piston rod 60 has a reduced diameter portion 62 to which a nut 248 is secured. A helical compression spring 250 disposed about the small diameter portion 62 abuts a washer 252 mounted against the shoulder at the juncture of the small and large diameter portions of the piston rod. The other end of this spring rides against the cylinder 64 which is rotatably mounted on an upstanding member 254 extending from the horizontal gate member 16. The small diameter portion 62 of the piston rod is slidably mounted in perforations in the opposite sides of cylinder 64 and passes through that cylinder just above the upper end of the upstanding member 254 which thus bears the weight of the piston rod. The screw 256 passes through the cylinder 64 into an annular groove 258 in the upstanding member 254, to prevent upward movement of the cylinder 64, but allows rotation of the cylinder. An opening 260 is provided at the lowermost part of cylinder 58 to allow drainage of condensed moisture and to permit air to flow into and out of the cylinder as the piston assembly moves in the cylinder.

When the gate is in its normal closed position, the piston rod 60 is outwardly extended from the cylinder and the piston assembly is disposed relatively close to the closure end 244 of the cylinder. As the gate is swung to its open position, the piston member 234 is moved toward the headpiece 226 to the position illustrated in FIGURE 15. The piston easily moves along the majority of the length of the cylinder 58 due to the fact that the diameter of the piston assembly is substantially less than the internal diameter of this part of the cylinder 58. When the cupped member 236 reaches the headpiece 226, only light resistance is encountered due to air passing by the periphery of the flexible cupped member.

The cylinder 58 and piston rod 60 are of such length, and the support arm 56 and upstanding member 254 are so located that the piston member 234 abuts the cylinder headpiece 226 before the gate is completely opened into contact with the post 102. This ensures that the air is virtually completely removed between the piston member 234 and the headpiece 226 before the gate is completely opened. When the piston abuts the headpiece 226, the spring 250 is compressed and small diameter portion 62 of the piston rod is moved with respect to the cylinder 64. After the gate reaches its fully open position against post 102, the force of gravity causes the gate to begin to close due to the inclined axis of rotation of the gate. By the time the cylinder 64 moves against the nut 248 the gate has acquired a little velocity and thus a sudden jerk is exerted on the piston rod 60 when the slack between the cylinder 64 and the nut 248 is eliminated. This sudden jerk causes a relatively high vacuum to be created in front of the cupped member 236 such that the resilient peripheral flange of the flexible cupped member 236 is forced tight against the interior of the headpiece 226.

The gate is held open because of the resulting vacuum lock of the piston assembly until the restricted air flow through the aperture 230 has allowed the piston 236 to slowly move along the length of the headpiece 226 to the beveled surface 232. Once the cupped member 236 of the piston has moved past the annular beveled surface 232, the large diameter portion of the cylinder 58 allows air to bypass the piston freely, thereby allowing the gate to rapidly return to its closed position. The position of the screw 228 may be adjusted to vary the duration of the vacuum lock and thus the time interval the gate remains open.

The cylinder support bar 56 is opopsite the axis of gate rotation from the piston rod supporting cylinder 64 when the gate is in its closed position, so that the vacuum lock cylinder operates the same way when the gate is opened in either direction from the closed position.

FIGURE 16 illustrates in greater detail the bumper contact frame 15 which is disposed perpendicularly to the central plane of the axial gate section 10 and extends equal distances to each side of the tubular member 14 to which it is rigidly secured. This bumper contact frame is rectangular, comprising horizontal structural members 262 and vertical bumper contact bars 264 at the opposite ends of members 262. These bumper contact bars are at the proper height to intercept all automobile and truck bumpers, and may be faced with resilient padding. These bumper bars insure a single point of contact between the vehicle bumper and the gate and deliver the vehicle's force directly to the yielding pivot axis between the two gate sections.

FIGURES 17 and 18 illustrate in greater detail the construction of support bar 36 which is connected, as by welding, to a cross member 266 through which pin 44 is disposed. A pair of bars 46 support the pin 44 at perforated square members 267 through which the pin extends. A plurality of flat blocks 268 are disposed above and below the square member 267. Pin 44 is secured within the upright bars 46 by suitable nuts 270. The vertical position of the pin 44 with respect to either of the upright bars 46 may be adjusted suitably to restore bar 36 to its correct posture transversely to the closed position of the gate. This adjustment is accomplished by removing certain of the flat blocks 268 and reinserting the blocks on the opposite side of the pin 44. Adjustability of the posture of gate supporting bar 36 is desirable because gate supporting posts are subject to shifting after a period of service and this can affect the operation of this gate adversely.

The present invention thus provides an improved automated gate which may be opened from either direction by a vehicle and which remains in an open position for a preselected time permitting the vehicle to move slowly against the gate and unhurriedly through it without being backlashed by the gate. It will be understood that the means for holding the gate closed could be located on the tubular member 84 of the supplemental gate and be a full equivalent of the herein described latch mechanism even though no part of the gate holding mechanism be on the swinging part of the gate. Also, it will be evident that various springs and various spring arrangements, or rubber bushings, may be employed to store energy when the gate is bowed and to swing the gate open when it is released from the closed position. Further, although the gate sections of the present gate have been disclosed as being relatively equal in length to provide a symmetrical appearance and guide the driver of the vehicle to the center of the gate, in some instances it may be desired to construct the gate sections with different lengths. Although a specific bumper contact bar has been shown, this may be supplemented or replaced by some contact means that is adapted to farm tractors.

Whereas the present invention has been described with respect to specific embodiments thereof, it will be understood that various changes and modifications will become apparent to one skilled in the art.

What is claimed is:

1. A bumper gate comprising:
   a gate mounted to swing in either direction from a closed position to an open position, said gate being divided into two sections pivotally connected along a vertical pivot axis to permit bowing,
   one of said sections having a cylinder along said pivot axis,
   the other section having higher and lower arms pivotally connected with the top and bottom ends of said cylinder, respectively,
   a torsion spring extending along the interior of said cylinder to the higher and lower arms,
   said higher arm having means for twisting the upper end of the spring in one direction when the gate is bowed in a certain direction and said cylinder having means to simultaneously twist the lower end of the spring in the opposite direction, and
   said lower arm having means to twist this lower end of the spring in this opposite direction when the gate is bowed in the opposite direction with respect to said certain direction and said cylinder having means to simultaneously twist the upper end of the spring in opposition to the twisting by the lower arm.

2. The bumper gate of claim 1 wherein said means for twisting the spring comprise annular segments integral with said cylinder and said higher and lower arms, said segments defining shoulders to bear against said spring.

3. A bumper gate comprising:
   a horizontally extending gate divided into two pivotally connected sections along a vertical pivot axis defined by a hollow elongated frame member of one section and higher and lower parts of the other gate section pivotally connected with the ends of said hollow elongated member,
   a torsion bar spring extending along the interior of said hollow elongated member and into the pivotally connected parts of the other gate section, and
   spring twisting elements integral with said hollow elongated member and said higher and lower parts for holding said spring torsionally stressed when the two gate sections are in alignment and to increase this stress by spring twisting when the gate is bowed in either direction.

4. An initially stiff two way resilient hinge mechanism comprising:
   a torsion bar spring having two opposite end portions,
   a pair of pivot members pivotally connected with each other at each of the end portions of said spring, one of said pivot members having a hollow elongated section surrounding said torsion bar spring,
   shoulders defined by said pivot members for holding said spring in a partially wound condition when said pivot members are in an initial angular relationship to each other and for additionally winding said spring when said pivot members are pivoted in either direction from said initial angular relationship,
   said shoulders being in pairs, one pair being on each said pivot member at each end portion of said spring, one member of each pair being on one side and the other member being on the opposite side of the same end portion of the spring,
   said shoulders of both pivot members at one end portion of said bar spring being directed clockwise for communicating torque in the clockwise direction,
   the shoulders of both pivot members at the other end portion of said bar spring being directed counterclockwise for communicating torque in the counterclockwise direction, and
   said torsion bar spring being partially wound between the clockwise directed shoulders at the one end portion and the counterclockwise directed shoulders at the other end portion when said pivot members are in the initial angular relationship, whereby said pivot members remain in the initial angular relationship until sufficient force is applied to said pivot members externally to additionally wind said spring.

5. The hinge mechanism according to claim 4 wherein each said end portion of said spring is provided with torque communicating means for simultaneously contacting the adjacent pairs of shoulders of both said pivot members when external force on said pivot members is insufficient to overcome the initial torsional stress of said spring, and for separately contacting each pair of shoulders when that pair is advanced relative to the other by pivoting movement of said pivot members in response to the application of external force overcoming the initial stress of the spring.

6. A bumper gate comprising:
   a horizontally extending gate divided into two pivotally connected sections along a vertical pivot axis to permit bowing thereof in either of two directions,
   a torison spring bar connected between said two pivotally connected sections with an initial torsional stress imposed thereon when said two gate sections are in alignment,
   means for holding said gate in a closed position and for releasing said gate when said gate is shortened by a desired degree of bowing, said torsion bar spring being subjected to increased stress upon bowing of said gate in either of two directions for storing energy, said energy being applied to propel said gate to an open position upon the release of said gate.

References Cited

UNITED STATES PATENTS

| | | | | |
|---|---|---|---|---|
| 1,231,763 | 7/1917 | Loprete | 49—9 X |
| 1,611,238 | 12/1926 | Sanborn | 16—75 |
| 2,691,836 | 10/1954 | David | 292—341.17 X |
| 3,044,764 | 7/1962 | Bonner | 49—30 |
| 3,209,391 | 10/1965 | Mangini | 16—75 X |
| 3,378,953 | 4/1968 | Barrowclough | 49—364 |

DENNIS L. TAYLOR, Primary Examiner

U.S. Cl. X.R.

16—75